(12) United States Patent
Kutter

(10) Patent No.: US 6,286,616 B1
(45) Date of Patent: Sep. 11, 2001

(54) HYBRID DRIVE MECHANISM FOR A VEHICLE DRIVEN BY MUSCLE POWER, WITH AN AUXILIARY ELECTRIC MOTOR

(76) Inventor: Michael Kutter, Burgwig 15 CH-4058, Basel (CH)

( * ) Notice: Subject to any disclaimer, the term of this patent is extended or adjusted under 35 U.S.C. 154(b) by 0 days.

(21) Appl. No.: 09/445,316

(22) PCT Filed: Jun. 4, 1998

(86) PCT No.: PCT/CH98/00241

§ 371 Date: Dec. 6, 1999

§ 102(e) Date: Dec. 6, 1999

(87) PCT Pub. No.: WO98/55353

PCT Pub. Date: Dec. 10, 1998

(30) Foreign Application Priority Data

Jun. 6, 1997 (CH) .................................................. 1376/97

(51) Int. Cl.[7] .................................................. B62M 23/02
(52) U.S. Cl. ........................ 180/205; 180/220; 180/65.5
(58) Field of Search ................................... 180/205, 206, 180/207, 220, 65.1, 65.5; 318/11

(56) References Cited

U.S. PATENT DOCUMENTS 5,272,938 * 12/1993 Hsu et al. ............................ 74/594.1
5,845,727 * 12/1998 Miyazawa et al. ................... 180/205
5,865,267 * 2/1999 Mayer et al. ......................... 180/205
6,125,959 * 10/2000 Seto et al. ............................ 180/207
6,152,250 * 11/2000 Shu-Hsien ............................ 180/220

FOREIGN PATENT DOCUMENTS 35 25 059   1/1987 (DE) .
709 909     4/1996 (EP) .
2 264 676  10/1975 (FR) .
96/25320    8/1996 (WO) .

* cited by examiner

Primary Examiner—Paul N. Dickson
Assistant Examiner—Avraham H. Lerner
(74) Attorney, Agent, or Firm—Pauley Petersen Kinne & Fejer

(57) ABSTRACT

A hybrid drive mechanism for a wheel-driven vehicle. The drive mechanism has an electromotor with a rotor and a stator as a first drive source, with a first speed and a first torque, and a pedal drive as a second drive source, with a second speed and a second torque. The stator of the electromotor is positioned on an axle or shaft of the drive train between the pedal crank and the drive wheel, preferably on a wheel axis, in such a way that it can rotate. The stator can be coupled mechanically with the second drive source so that the stator is driven by the second drive source, and the rotor of the electromotor has a speed which corresponds to the sum of the first speed of the first drive and the second speed of the second drive.

16 Claims, 2 Drawing Sheets

HYBRID DRIVE MECHANISM FOR A VEHICLE DRIVEN BY MUSCLE POWER, WITH AN AUXILIARY ELECTRIC MOTOR

BACKGROUND OF THE INVENTION

1. Field of the Invention

This invention relates to a hybrid propulsion system for a wheel-driven vehicle with an electric motor, which has two propulsion sources.

2. Description of Prior Art

Auxiliary electrical propulsion systems for vehicles powered by a rider, such as bicycles, tricycles and wheelchairs, have been known for some time.

Propulsion by an auxiliary electric motor is common to all these known vehicles, wherein the motor drives the driven wheel in parallel with the muscle power of the rider. This means that both sources of propulsion act in parallel to provide propulsion, so that their driving torque is added together.

As a result, the two sources of propulsion, the electric motor and the muscle power, act on the same driven wheel. The rpm of the two sources of propulsion are therefore coupled.

An increase in the rpm of the one source of propulsion does not necessarily result in a noticeable increase in the speed of movement. Instead, the other source of propulsion is relieved by this, until at the end its power output drops to zero.

It is possible to remedy this cause superficially by the use of a free-wheeling device, overriding clutches and the like.

It is thus possible to ride, for example, a bicycle with an auxiliary electrical propulsion system at higher speeds than the speed based on the maximum rpm of the motor, without the electric motor acting as a brake. However, it is the nature of the free-wheeling device, or respectively the overriding clutch, that the electric motor no longer provides a propulsive output for movement.

Therefore an increased use of the muscle power of the rider does not cause an appreciable increase in riding speed, but only a relief on the electric motor. With riders who like to move, this leaves an unsatisfied feeling, since they are used to experience an increase in riding speed as a result of an increase in muscle power, even on a non-motorized bicycle.

Frequent shifting is an unpleasant fact for most riders, which reduces the pleasure of riding. By none of the known gear-shifting methods, neither a chain changer nor a hub gearshift, is this unpleasant fact satisfactorily resolved.

Furthermore, in connection with the known electrically driven bicycles it is necessary for the two sources of propulsion, the electrical propulsion system and the muscle power, to operate at the same rotational speed. This means that, for example, an increase in the rotations per minute (rpm) of the electric propulsion system, for increasing the riding speed, is unavoidably connected with an increase in the rpm of the muscle-powered propulsion system. In the case of a bicycle with an auxiliary electric propulsion system this means an increase in the pedaling frequency of the rider. However, ordinary riders are only comfortable within a very narrow range of the pedaling frequency. This range normally lies between 50 and 60 revolutions per minute. It is of course possible to even this out within a defined range by means of known bicycle gearshift devices, for example a chain changer or a hub gearshift. But this means that the rider must operate the gearshift continuously.

SUMMARY OF THE INVENTION

This invention is based on eliminating the above mentioned disadvantages to the greatest possible extent by creating a sporty bicycle with an auxiliary motor which converts each additional employment of the muscle power of the rider into an increased riding speed in each operational state, and in this way lends a very sporty feel to the ride. It is also intended to relieve the rider of the manual operation of a chain changer or a hub gearshift. It is intended to make riding at any speed possible, while the pedaling frequency remains the same.

The two propulsion sources should be able to provide propulsion at any desired rpm, completely independently of each other.

In accordance with this invention, this is achieved by means of a hybrid propulsion system with the characteristics set forth in this specification and in the claims. Thus, an electric motor, a so-called wheel hub motor, is used, which directly drives each driven wheel.

With the arrangement in accordance with this invention, the two propulsion sources, the electric motor and the muscle power, can provide propulsion at any, completely different rpm. For example, the electric motor can provide propulsion at very high rpm, while the muscle power aids in the propulsion at very low rpm, for example fast riding along with comfortable pedaling, or exactly vice versa, rapid, sporty riding along with low current use. The output of both propulsion sources is completely converted into movement energy and increased riding speed. Each increase in the rpm of one of the two propulsion sources results in an increase of the riding speed, because the rpm of the two propulsion sources are added, or respectively superimposed on each other.

In the case of a bicycle with an auxiliary motor, an increase in riding speed occurs with each increase in the pedaling output of the rider. This means that a sporty rider can ride a bicycle, in accordance with this invention, arbitrarily fast. No restricting limits are set for him by the maximum rpm of the electric motor.

The riding speed of a vehicle in accordance with this invention can be arbitrarily changed by an appropriate control of the rpm of the electric motor as a function of the pedaling frequency, even though the pedaling frequency of the rider remains constant. This can be regulated by an appropriate electronic device in such a way that the pedaling speed is kept constant over a wide range of different riding conditions, and the operation of a bicycle gearshift is omitted.

The muscle-powered propulsion system can be selectively engaged with the stator or the rotor of the electric motor by means of any coupling device, for example a dog coupling or ratchets known from the hub gearshift. Thus, two completely different types of propulsion are available to the rider, one for slow speeds on a hill, which provides parallel propulsion and adds the torques together, and one for faster riding on level ground, which adds the rpm together.

The propulsion system in accordance with this invention is used in various fields. It is preferably employed in bicycle-like vehicles.

Direct driving, brushless d.c. motors are most frequently used. They can be employed with particular advantage at the relatively low rpm. However, direct-drive motors with commutation by means of brushes are also conceivable. In these cases the electronic control device is preferably housed outside of the hub, or at least on a non-moving element inside the hub. It is thus necessary to attach only two contact rings for transmitting the positive and the negative poles.

In connection with multi-wheeled hybrid vehicles driven by muscle power and an electric motor, the propulsion system in accordance with this invention can be placed as an intermediate shaft in the drive train between the crank and the rear wheel. With such an arrangement it is possible to also use electric motors with less torque, such as conventional, mechanically commutated d.c. motors, wherein the stator, generally embodied as a housing, is driven by muscle power. The power take-off rpm generated by the muscle power and the electric propulsion system can be picked up at the power take-off side and can be transferred by chains or a toothed belt transmission to the driving wheel.

On a bicycle with an auxiliary electrical propulsion system, the entire propulsion unit is preferably housed in the rear wheel. Here, the stator of the electric motor as well as the toothed rings driven by muscle power are rotatably seated on a central shaft. The rotor of the electric motor is designed as the housing of the wheel hub enclosing the stator, which is connected with the rim by commercially available spokes. The stator, which is also rotatably seated on the central shaft, is housed inside the rotor designed as the housing of the hub. The housing of the wheel hub used as the rotor is preferably made of two parts, for the simple assembly of the unit. To increase the ease of riding, the muscle-powered propulsion system can be selectively frictionally connected with the stator or the rotor of the electric motor. The most diverse coupling devices, for example dog couplings or ratchet couplings known from the hub gearshift or similar, can be used. In the exemplary embodiment represented, a structurally very simple coupling using stop bolts is employed.

The rotor embodied as a wheel hub can be designed to be seated on one side, or can be constructed as an element which completely encloses the stator and is respectively supported by a bearing on both sides of the stator. The bearing supported on the shaft driven by muscle power in this case is usefully embodied as a free-wheeling device.

These and further advantageous exemplary embodiments are set forth in the claims.

BRIEF DESCRIPTION OF THE DRAWINGS

Two exemplary embodiments of this invention are represented in the drawings and explained by the subsequent description wherein.

DESCRIPTION OF PREFERRED EMBODIMENTS

Figure 1:
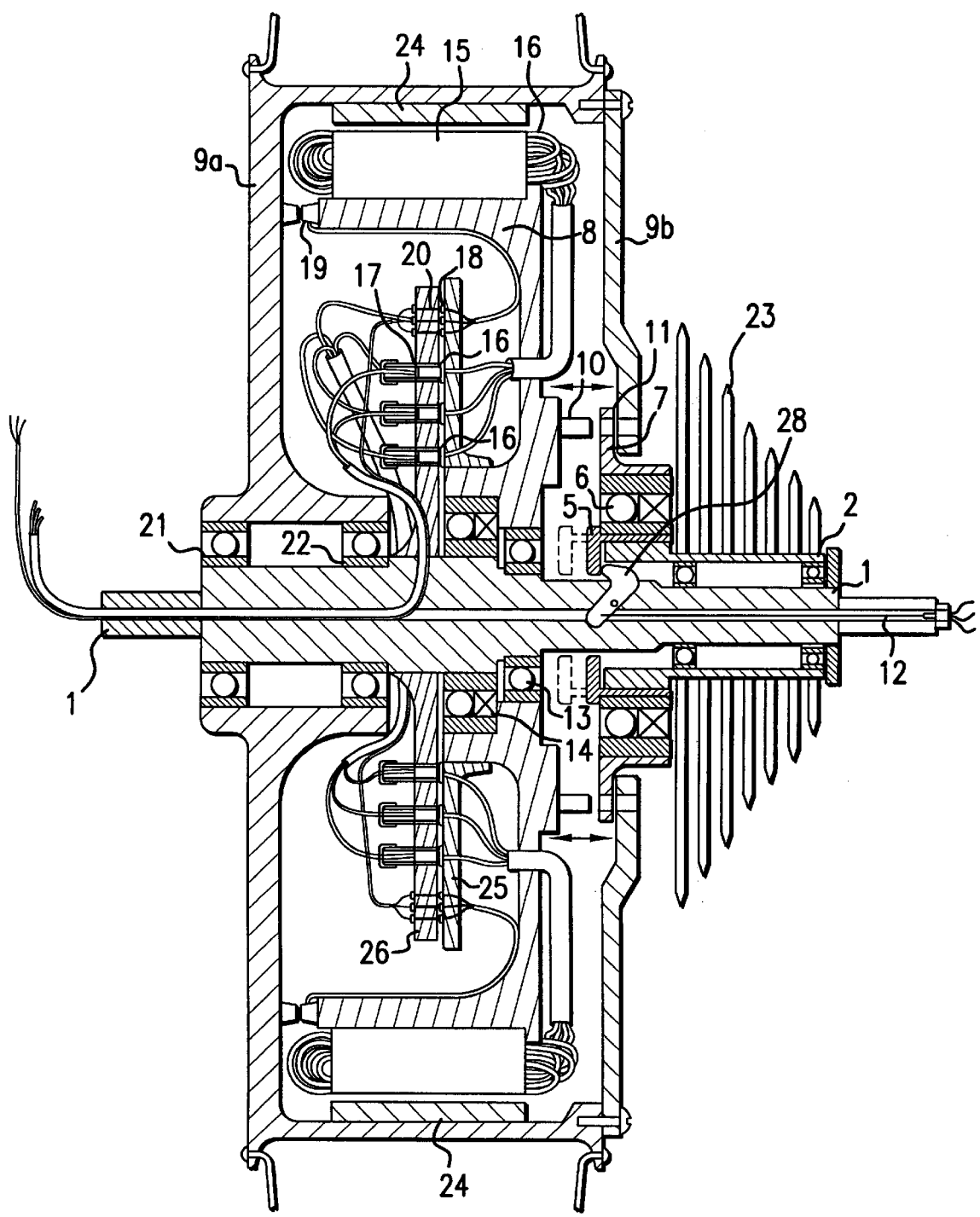
FIG. 1 is a vertical axial section view taken through a driving hub of a bicycle.

The exemplary embodiment shown in FIG. 1 is a possible arrangement of a propulsion system in accordance with this invention in a bicycle, using a brushless d.c. motor and a one-sided seating of a rotor designed as a wheel hub.

In the example represented, a rotor 9 of an electric motor, which is electrically driven with first rotations per minute (rpm) with respect to a stator 8, is designed as the hub of a wheel enclosing the stator. The stator 8 of the electric motor is rotatably seated and can be driven at second, arbitrary rpm by the toothed rings 23 of a pedal drive by means of the mechanism which will be subsequently described. Rpm resulting at the rotor 9, i.e. the hub of the wheel, corresponds to the sum of the first rpm and the second rpm.

A sleeve 2 is rotatably seated by means of ball bearings 3 and 4 on a central, hollow axle 1 and is frictionally connected with the toothed rings 23 of the pedal drive. A flange-like element 5 is pushed over one end of the sleeve 2 and is interlockingly connected by means of teeth with the sleeve 2, but can be axially displaced. A flange 7 is rotatably seated by means of ball bearings and a free-wheeling device 6 on the flange-like element 5. By means of a lever 28 with an associated Bowden cable 12, as well as a restoring spring, not shown in the drawing, the flange 7 can be selectively engaged with the stator 8 which is provided with bolts 10, or with the rotor 9 which is provided with bolts 11. The pedal drive can be selectively connected in this way with the stator 8 or the rotor 9, frictionally connected as the housing of the hub. It is thus selectively possible to add the rpm of the pedal drive and the rpm of the electric motor, or to add the torques of the pedal drive and the electric motor. The selective transfer of force of the muscle power to the stator 8 or the rotor 9 of the electric motor can be accomplished by means of any arbitrary coupling.

The stator 8 is rotatably seated on the central axle 1 by means of the ball bearing 13 and the free-wheeling device 14. The free-wheeling device 14 prevents retrograde rotation of the stator 8 when no pedaling takes place or when the pedal drive is connected with the rotor 9.

The stator stampings 15 and the windings are applied to the stator 8, and get current by means of an appropriate device, in the case represented via collector rings 16 and carbon brushes 17. The signals from the sensors 19 for detecting the rotor position are transmitted via collector rings 18 and brushes 20, or similar devices.

The data regarding the relative position and relative movement of the stator 8 with respect to the rotor 9, which are detected by means of the sensor device 19, are supplied to an electronic regulator, which can be arranged inside or outside of this propulsion structure.

In the represented exemplary embodiment, the rotor 9 is embodied as the housing of the hub of the bicycle and encloses the stator 8, and it is seated on one side by means of ball bearings 21 and 22 on the side opposite the muscle-powered propulsion system. A rotor, embodied as a housing, can also be constructed as a component which completely encloses the stator 8, and it can be seated by means of a bearing, which is located near the toothed ring 23 of the pedal drive and seated on the sleeve 2 and is simultaneously embodied as a free-wheeling device.

In this case, for the drive condition of torque addition, i.e. when the pedal drive is to be directly frictionally connected with the hub, the rotor, it is only necessary to uncouple the pedal drive from the stator 8. By means of the bearing, which is embodied as a free-wheeling device, the moment of the pedal drive is transmitted to the rotor 9, while the free-wheeling device 14 absorbs the reaction moment of the stator 8 and prevents its retrograde rotation.

The propulsion system in accordance with this invention also has a useful application as an auxiliary drive for wheelchairs. Up to now, purely electrical propulsion systems have mainly been used for wheelchairs, which are mostly regulated by a manual operation. For many handicapped persons, who no longer can move their wheelchairs under their own power, such propulsion systems are a great help. But at the same time they lack any daily body training, which would be very beneficial to their health.

Wheelchairs which are propelled purely by muscle power, and have a tire-shaped manual propulsion rail, represent a very useful and simple solution, but often overtax the strength of the handicapped persons.

Based on the knowledge that training of the body is of particular importance for handicapped people, wheelchairs were developed, which, by means of sensors attached to the manual propulsion device, detect the force applied by the rider and amplify it using an electric motor housed in the wheel hub. This has an effect on the propulsion of the wheelchair which is comparable to power steering.

However, the problem that faster travel than at walking speed can hardly be achieved by propelling the manual propulsion rail remains unsolved.

These problems can be overcome in a completely novel way by means of the propulsion system in accordance with this invention. Preferably direct-drive electric motors are housed in the hubs of the two wheels, whose rotatably seated stators can be driven by muscle power via the fire-shaped manual propulsion rail. In this way the first rpm generated by the electric motor and the second rpm transferred by the rider by means of the manual propulsion rail to the stator are superimposed. Third rpm which corresponds to the sum of the first rpm and the second rpm result at the rotor 9, which is connected by means of spokes or directly with the rim. It is therefore easily possible to generate high power take-off rpm at the rim, although the propulsion at the manual propulsion rail is performed only with rpm which are comparable to walking speed. A second tire-shaped manual propulsion rail, which is in operative connection with the rotor 9, i.e. the rim, can be provided for riding up slopes, where an increased moment is required at the wheel. If propulsion is performed at this manual propulsion rail, there is no superimposition of rpm, it is possible instead to add the torque of the manual propulsion system and of the electric propulsion system together.

In this way a wheelchair can have a propulsion system which, depending on the requirements or the wishes of the rider, alternatingly amplifies the force transmitted to the manual propulsion system, for riding on slopes or for maneuvering, or multiplies the rpm transmitted to the manual propulsion rail. To change from the one type of operation to the other it is only necessary to propel the one or the other manual propulsion rail. In a suitable manner two manual propulsion systems per wheel, which are located close to each other, or two manual propulsion systems of different diameter, are used for this purpose. Also conceivable is a single manual propulsion rail per wheel, which can be operatively connected with the stator 8 of the electric motor or the rotor 9 by means of an appropriate coupling arrangement.

A preferred embodiment of the propulsion system is attained by seating the rotor 9 and the stator 8 of the electric motor on a central axle. Preferably the rotor 9 and the stator 8 are designed as respective pan-shaped elements, wherein the rotor 9 encloses the stator 8 and is designed as the hub of the wheel. Depending on the diameter of the wheel and of the rotor 9, this hub-shaped rotor can be connected by means of spokes with the rim, or make a direct transition into the rim. The design with two manual propulsion rails per wheel is technically very simple and, in connection with the change between the two modes of operation, provides a very user-friendly solution. A free-wheeling device, which locks in the retrograde direction of rotation, is provided for receiving the reaction moment at the stator 8 when the outer manual propulsion rail, which is directly connected with the rim, the rotor, is being driven. Housing of the electronic control device on the stator 8 makes the transmission of the electrical energy possible by means of only one collector ring for transmitting the positive pole, while the negative pole is transmitted via the frame. To detect the output transmitted to the manual propulsion rail connected with the stator 8, a sensor for detecting the relative rpm between the stator 8 and the fixed shaft is sufficient.

Figure 2:
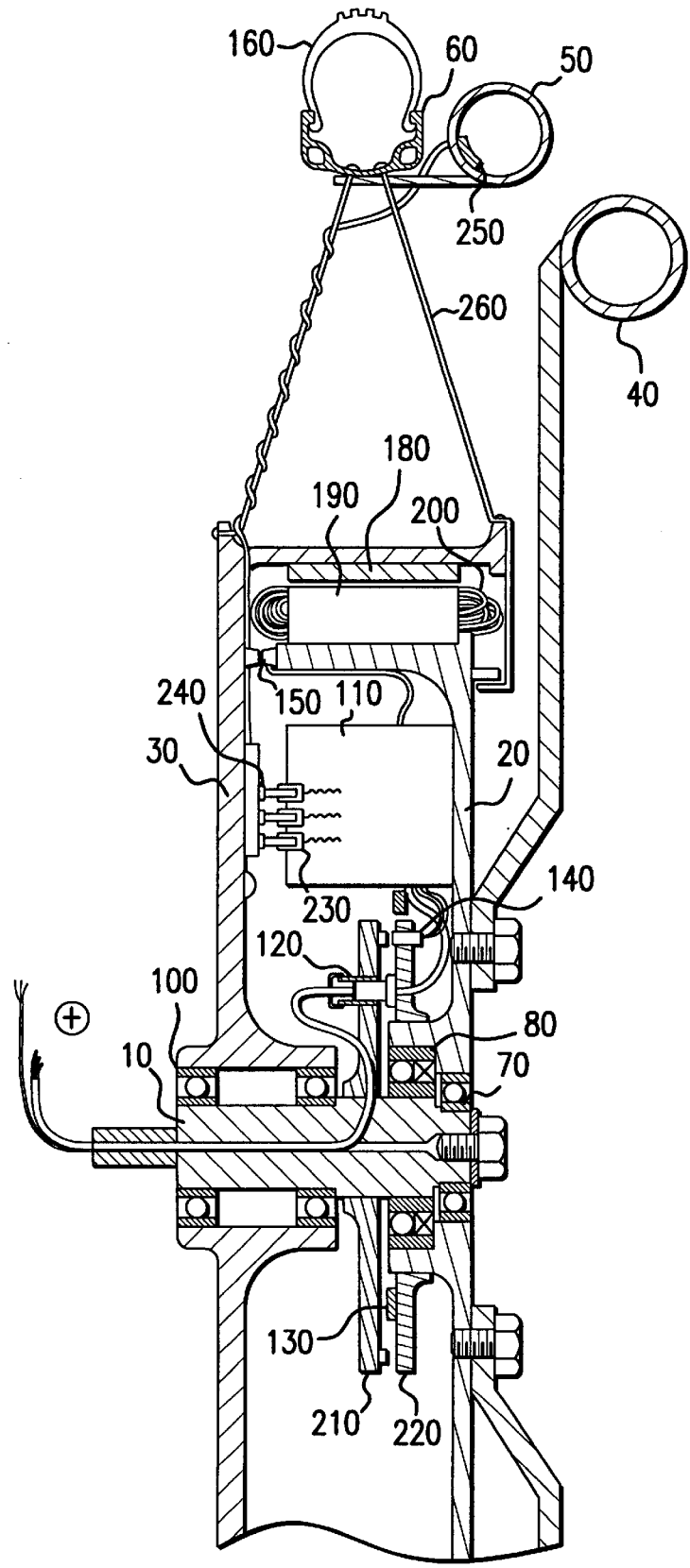
FIG. 2 is a vertical axial section view taken through a driving hub of a wheelchair.

The exemplary embodiment in FIG. 2 shows a possible arrangement of the propulsion system in the hub of a wheelchair. Two manual propulsion rails 40 and 50 are used in the example represented, of which the first manual propulsion rail 40 is frictionally connected with the stator 20, the other manual propulsion rail 50 with the rim 60 of the wheelchair, the rotor of the electric motor.

Both the stator 20 and the rotor 30 are rotatably seated by means of ball bearings 70 and 80, or respectively 90 and 100, on the central axle 10. A free-wheeling device 80 is preferably used for the one bearing of the stator 20, which prevents the retrograde rotation of the stator 20 in those operational states where propulsion is only performed by means of the outer manual propulsion rail 50.

In the represented example, the rotor 30, designed as a housing, is connected by means of spokes 170 with the rim 60. Magnets 180 are arranged on an inside. The stator stampings 190 and the stator windings 200 which are applied to the stator 30 form the electric motor, which generates the first rpm.

The inner, second manual propulsion rail 40, which is connected with the stator 20 of the electric motor, is manually propelled at the second rpm which are detected by means of the sensor 140 and first rpm of the electric motor, which are matched to it by means of the electronic control device 110, and are added. Third rpm result at the rotor 30 of the electric motor, i.e. at the rim of the wheel, which correspond to the sum of the first rpm and the second rpm.

Propulsion is performed at the outer manual propulsion rail 50 connected with the rim, which corresponds to the first rpm of the electric motor. In this operational state the torque applied at the manual propulsion rail 50 can be amplified by the electric motor. To take up the reaction moments occurring in the stator 20, which is at rest in this operational state, a free-wheeling device 80, which blocks in the retrograde direction, is provided. A sensor 250 is provided to detect the output provided at the outer manual propulsion rail.

In the represented example, the electronic control device 110 is attached to the stator 20. It is provided with current via the carbon brushes 120 and the collector ring 130. The negative pole is conducted over the frame.

Respectively one flange-shaped element 210 and 220 is provided for receiving the carbon brushes 120, or respectively the collector ring 130, as well as the sensor 140.

Only the rpm of the stator 20 in relation to the central axle is detected by the sensor 140 for determining the output provided at the manual propulsion rail 40. The relative rpm of the rotor with respect to the stator, as well as the respective rotor position, are detected by means of the sensor 150.

The control of the wheelchair merely by means of the rpm of the rotor detected via the sensor is already sufficient for a very practical wheelchair.

If propulsion occurs at the outer manual propulsion rail 50, the drive moment can be amplified by the electric motor. Thus a further sensor 220 is provided at the outer manual propulsion rail, which detects the output provided by the rider on the outer manual propulsion rail. It is possible to amplify the torque, which is provided at the outer manual propulsion rail, by the electric motor, particularly on slopes. However, the transmission of signals from the sensor 250 to the electronic control device, which rotates along with the stator, is required. In the represented example this is achieved by means of the brushes 230 and the collector rings 240.

What is claimed is:

1. In a hybrid propulsion system for a wheel-driven vehicle with an electric motor which has a rotor and a stator forming a first propulsion source with a first rotations per minute (rpm) and a first torque, and a second propulsion source with a second rpm and a second torque, the improvement comprising: the stator of the electric motor rotatably arranged on one of an axle and a shaft of a drive train between a pedal crank and a drive wheel which can be mechanically connected with the second propulsion source so that the stator is driven by the second propulsion source, and the rotor of the electric motor having a rotational speed that corresponds to a sum of the first rpm of the first propulsion system and the second rpm of the second propulsion system.

2. In the hybrid propulsion system in accordance with claim 1, wherein the second propulsion source is alternatingly coupled with one of the stator and the rotor, so that one of torques and the rpm of the propulsion systems are added together.

3. In the hybrid propulsion system in accordance with claim 1, wherein the second propulsion source is a muscle-powered propulsion system.

4. In the hybrid propulsion system in accordance with claim 1, wherein the electric motor is an external rotor motor.

5. In the hybrid propulsion system in accordance with claim 4, wherein the stator is rotatably arranged on a second axle of a driven wheel and the rotor is a part of a wheel hub.

6. In the hybrid propulsion system in accordance with claim 1, wherein the electric motor is an electronically commutated electric motor.

7. In the hybrid propulsion system in accordance with claim 6, wherein a free-wheeling device is introduced between a stator of the first propulsion source and the second propulsion source.

8. In the hybrid propulsion system in accordance with claim 7, wherein a free-wheeling device is introduced between the shaft driven by muscle power and the rotor of the electric motor driven at the first rpm.

9. In the hybrid propulsion system in accordance with claim 8, wherein the vehicle is a bicycle.

10. In the hybrid propulsion system in accordance with claim 8, wherein the vehicle is a wheelchair and a hybrid propulsion system is housed in each of two driven wheels.

11. In the hybrid propulsion system in accordance with claim 2, wherein a sleeve is seated on the axle on which a plurality of toothed rings of a muscle-powered propulsion system are arranged, wherein the sleeve is interlockingly held on a first flange which is displaceable on the sleeve, while a second flange (7) is displaced on the first flange by an intermediate bearing with a free-wheeling device that with interlocking means (10, 11) can be alternatively engaged with one of the stator and the electric motor.

12. In the hybrid propulsion system in accordance with claim 1, wherein a plurality of sensors are arranged on one of the stator and the rotor which detect a relative movement of motor elements with respect to each other, and the signal detected is supplied to a regulating device for regulating the electric motor.

13. In the hybrid propulsion system in accordance with claim 1, wherein a free-wheeling device is introduced between a stator of the first propulsion source and the second propulsion source.

14. In the hybrid propulsion system in accordance with claim 1, wherein a free-wheeling device is introduced between the shaft driven by muscle power and the rotor of the electric motor driven at the first rpm.

15. In the hybrid propulsion system in accordance with claim 1, wherein the vehicle is a bicycle.

16. In the hybrid propulsion system in accordance with claim 1, wherein the vehicle is a wheelchair and a hybrid propulsion system is housed in each of two driven wheels.

* * * * *